May 15, 1956
G. E. CHEVALLIER
2,745,682
SWIVEL COUPLING FOR GASOLINE DISPENSERS
Filed Oct. 27, 1952
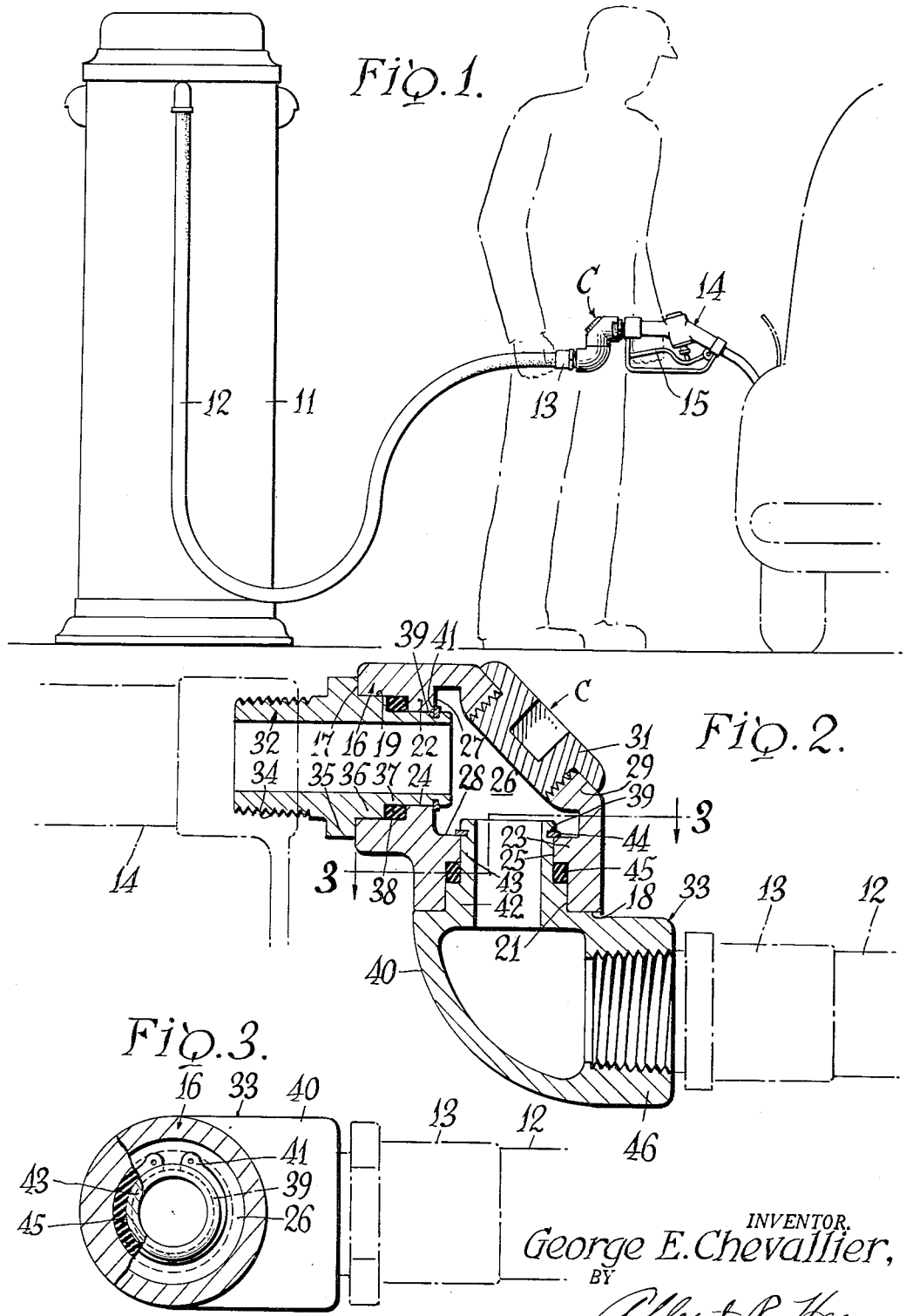
INVENTOR.
George E. Chevallier,
BY
Albert R. Henry
ATTORNEY

United States Patent Office 2,745,682
Patented May 15, 1956

2,745,682
SWIVEL COUPLING FOR GASOLINE DISPENSERS

George E. Chevallier, Salisbury, Md., assignor to The Wayne Pump Company, Salisbury, Md.

Application October 27, 1952, Serial No. 317,057

1 Claim. (Cl. 285—9)

This invention relates to swivel couplings for gasoline dispensers, and it has particular reference to the provision of a coupling having two relatively rotatable members adapted to be connected respectively to the hose end and the nozzle of a gasoline dispensing pump, whereby the attendant has greater freedom in manipulating both hose and nozzle, and destructive strains on the hose are minimized.

In the well known type of gasoline dispensing pump, the fluid is forced by a pump through a meter and thence into a hose on the outside of the pump cabinet, which terminates in a nozzle adapted to be inserted into the automobile storage tank, and through which the flow is controlled by a manually operable valve. A certain percentage of motorists persist in stopping their cars at positions adjacent the pump which makes it difficult for the attendant to insert the end of the nozzle in the tank filling opening, and the attendant therefore must pull and twist on the hose in order to make delivery. The resulting strains cause the hose to fail prematurely, and at the places where the strains are most severe, namely, at the ends of the hose adjacent the pump cabinet and at the nozzle.

Gasoline, of course, is a highly flammable and hazardous liquid, and it is under pressure in the hose. Failures of the type just mentioned are therefore serious, and may require the shutting down and isolating of the pump island during a busy part of the day while a replacement is being made. While any kind of swivel coupling might be assumed to be useful in minimizing failures of this nature, another complication arises from the circumstance that all parts of a dispensing pump must meet very rigid standards of the Fire Underwriters Laboratories and other authorities, and these require that any proposed coupling itself shall be leak proof and have a long service life.

The present invention provides a swivel coupling for gasoline dispensing hose which has been found to meet the various Code specifications, relieve excessive strains in the hose, and enable the attendant to manipulate both hose and nozzle with greater facility and thereby expedite service to the customers. The invention is illustrated in the accompanying drawing, wherein:

Fig. 1 is a view of the coupling connected in a hose line as it would be employed in service;

Fig. 2 is an enlarged axial section through the coupling; and

Fig. 3 is a section on the line 3—3 of Fig. 2.

As shown in Fig. 1, a dispensing pump 11 is provided with a hose 12 having a threaded male coupling 13 connected to its free end, which is connected to the swivel coupling C of the present invention. A dispensing nozzle 14 is also connected to the coupling C, and it may be manipulated by the attendant through a control lever 15 to admit or shut off flow of gasoline to an automobile or other receptacle.

As shown in Figs. 2 and 3, the coupling C comprises a right angled hollow body 16 of generally circular cross section and having plane ends 17 and 18 at right angles to each other and which are cored and bored to form annular shoulders 22 and 23, which in turn are concentrically formed with bearing openings 24 and 25. These open into a chamber 26, which is bounded by the right angled inner walls 27 and 28 of the shoulders 22 and 23, and by a top wall 29 disposed at an angle of 45° to the horizontal and vertical axes through the recesses 19 and 21 and the openings 24 and 25. The body 16 is symmetrical with respect to a perpendicular through the top wall 29 and the intersection of the horizontal and vertical axes, but it has been deemed expedient to designate similar parts by separate reference numerals, inasmuch as they are angularly disposed. Reference to horizontal and vertical axes will therefore be recognized as being simply for descriptive purposes, as the body 16 can obviously be turned to any position. The wall 29 is cored, drilled, and threaded to receive a closure plug 31 which may be soldered lightly after final assembly to safeguard against tampering or any possibility of leakage.

That portion of the body 16 which has been described as being around the horizontal axis receives a male threaded nozzle coupling 32, while the other portion of the body 16 receives a female threaded hose coupling 33. The coupling 32 comprises a threaded end 34, adapted to be screwed into the end of the nozzle 14, which terminates adjacent a polygonal enlarged portion 35 abutting the outer end 17 of the body 16. The portion 35 merges into a cylindrical portion 36 which has bearing engagement within the recess 19, and it in turn merges into a cylindrical portion 37 which is in bearing engagement with the opening 24 and which projects a short distance into the chamber 26.

The portion 36 is spaced from the shoulder 22 to provide an annular cavity which is occupied by a sealing ring 38 made of one of the available gasoline resistant synthetic rubbers. The inner end of the coupling 32 is formed with an annular groove 39 which receives a snap ring 41 to retain the parts in assembled relation. The ring 41 is advantageously of metal having good bearing properties, such as Phosphor bronze, and its inner face is in bearing engagement directly with the vertical wall 27 which is parallel to the end face 17. The parts are so dimensioned that the ring 41 and portion 35 constitute thrust bearings against the walls 17 and 27, and also restrain the coupling 32 from axial movement or displacement, while the annular surfaces of the portions 36 and 37 constitute radial bearings. The packing 38 prevents any tendency toward leakage along these closely fitted surfaces, while enabling the coupling to be turned in either direction about the horizontal axis, as by twisting the nozzle 14 out of the reference plane.

The coupling element 33 is also formed with an enlarged portion 40 bearing against the end face 18, and cylindrical portions 42 and 43 having bearing engagement with the bores 21 and 25 of the body 16. This member is also retained in the body 16 by a snap ring 44 which cooperates with the wall 28 to form a thrust bearing, and the joint is sealed by a packing ring 45, in the same manner as has been described with respect to the coupling 32. The member 33 is accordingly rotatable about the vertical reference axis, and the nozzle 14 may therefore be positioned at any desired angle with respect to the hose coupling 13. The coupling 33, unlike the coupling 32, is formed as a right angled body, having a portion 46 which is tapped to receive the male thread of the hose terminal coupling 13. The hose and nozzle may thus be brought into parallelism, as shown in the drawing.

It is believed that the mode of assembly will be obvious from the foregoing description. The coupling member 32 and 33 are inserted in the like ends of the body 16 against their respective packing rings, and the snap rings are inserted through the opening of the wall 29, which is large enough for this purpose. Both members 32 and 33 are therefore rotatably retained in position. The plug 31 is then inserted and sealed. It will be seen that the coupling C permits the attendant to turn the nozzle 14 in any position with respect to the hose 12, and thereby avoid twisting, kinking, or excessive bending. Another advantage is that this facility of manipulation has the effect of increasing the length of the hose, inasmuch as the attendant can reach a tank a foot or so farther away than he could otherwise, although the coupling itself is quite compact.

It is intended, of course, that the invention should be accorded a scope commensurate with that set forth by the following claim.

I claim:

A swivel coupling for connecting the nozzle of a gasoline dispensing unit to the hose of said unit whereby the nozzle may be rotated without placing undue strain on the hose, said coupling comprising a hollow body having end faces angularly disposed with respect to each other, relatively large and small bores extending into the interior of the body from said end faces, internal annular shoulders formed at the junctions of said large and small bores, said shoulders having internal faces parallel to the end faces and angularly disposed with respect to each other, said internal faces and other parts of said body defining an internal chamber in communication with said bores, said internal chamber, adjacent each internal annular shoulder having a greater dimension and area than said relatively small bores, said body having a wall formed with an opening communicating with said chamber to provide access to said internal shoulder faces, said wall extending at an angle perpendicular to a bisector of said angularly disposed end faces, hollow members rotatably positioned in said bores, each of said hollow members having an enlarged portion abutting one of said end faces and also having relatively large and small annular portions externally thereof in bearing engagement respectively with the large and small bores of the body, said relatively large annular portion being spaced from the outer face of the body shoulder, said relatively small annular portion extending through the relatively small bore and into said chamber, a groove formed in said relatively small portion in alignment with the internal face of said body shoulder, a split retaining ring positioned in said groove and having thrust bearing engagement with said internal face, whereby said hollow member is restrained from axial displacement and may be rotated on its own axis, said ring having means which permit it to be snapped into said groove with simple tools, said wall opening being sufficiently large to permit insertion of said ring into said chamber and placement thereof in said groove, packing material in the space between the outer surface of the shoulder and the relatively large annular portion, each of said hollow members being formed with means for making a pipe connection thereto, and a closure for the opening in said wall.

References Cited in the file of this patent

UNITED STATES PATENTS

| | | |
|---|---|---|
| 664,479 | Hughson | Dec. 25, 1900 |
| 848,162 | Enright | Mar. 26, 1907 |
| 960,744 | Vogel | June 7, 1910 |
| 1,717,640 | Weisgerber | June 18, 1929 |
| 1,938,829 | Hamer | Dec. 12, 1933 |
| 2,443,993 | Schenkelberger | June 22, 1948 |
| 2,480,174 | Yost | Aug. 30, 1949 |
| 2,501,638 | Warren | Mar. 21, 1950 |
| 2,595,787 | Heimann | May 6, 1952 |

FOREIGN PATENTS

| | | |
|---|---|---|
| 25,960 | Great Britain | Nov. 12, 1913 |